United States Patent
Tillet et al.

(10) Patent No.: US 7,738,897 B2
(45) Date of Patent: Jun. 15, 2010

(54) BROADCAST DISPATCH CHATROOM

(75) Inventors: Dan Tillet, Oak Hill, VA (US); David Martin, Chantilly, VA (US); Karalyn Szuszczewicz, Haymarket, VA (US); Trinh D. Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 353 days.

(21) Appl. No.: 11/454,830

(22) Filed: Jun. 19, 2006
(Under 37 CFR 1.47)

(65) Prior Publication Data
US 2007/0037599 A1    Feb. 15, 2007

Related U.S. Application Data

(63) Continuation-in-part of application No. 11/227,412, filed on Sep. 15, 2005, and a continuation-in-part of application No. 11/227,392, filed on Sep. 15, 2005.

(60) Provisional application No. 60/610,554, filed on Sep. 17, 2004, provisional application No. 60/689,079, filed on Jun. 10, 2005, provisional application No. 60/610,553, filed on Sep. 17, 2004, provisional application No. 60/703,886, filed on Aug. 1, 2005, provisional application No. 60/691,862, filed on Jun. 18, 2005.

(51) Int. Cl.
*H04B 7/00* (2006.01)
(52) U.S. Cl. .................................... 455/519; 709/225
(58) Field of Classification Search ................ 455/519, 455/90.2; 709/204, 225, 229
See application file for complete search history.

(56) References Cited

U.S. PATENT DOCUMENTS

| | | | | |
|---|---|---|---|---|
| 7,133,896 B2 * | 11/2006 | Ogdon et al. | ............... | 709/205 |
| 7,330,541 B1 * | 2/2008 | Surazski et al. | ......... | 379/202.01 |
| 2004/0098455 A1 * | 5/2004 | Ellis et al. | .................... | 709/204 |
| 2005/0034079 A1 * | 2/2005 | Gunasekar et al. | .......... | 715/753 |
| 2006/0058052 A1 * | 3/2006 | Plestid et al. | ............... | 455/519 |

\* cited by examiner

*Primary Examiner*—Tu X Nguyen

(57) ABSTRACT

A method and system for conducting a dispatch multi-party communication session is disclosed. In accordance with an embodiment of a method of the present invention, the method includes establishing a dispatch multi-party communication session in a dispatch network, conducting a first portion of the session in a broadcast mode, and conducting a second portion of the session in an open mode. In accordance with an embodiment of a system of the present invention, the system includes the dispatch network wherein the network establishes a dispatch multi-party communication session and wherein the network conducts the first portion of the session in the broadcast mode and the second portion of the session in the open mode.

23 Claims, 4 Drawing Sheets

BROADCAST DISPATCH CHATROOM

This application is a continuation-in-part of U.S. patent application Ser. No. 11/227,412, filed Sep. 15, 2005, which claims the benefit of provisional application Nos. 60/610,554, filed Sep. 17, 2004 and 60/689,079, filed Jun. 10, 2005, and a continuation-in-part of U.S. patent application Ser. No. 11/227,392, filed Sep. 15, 2005, which claims the benefit of provisional application Nos. 60/610,553, filed Sep. 17, 2004 and 60/703,886, filed Aug. 1, 2005, and claims the benefit of provisional application No. 60/691,862, filed Jun. 18, 2005, the disclosures of which are herein expressly incorporated by reference.

FIELD OF THE INVENTION

The present invention relates generally to the field of telecommunications, and in particular, to dispatch chatrooms.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a "walkie-talkie" type of call, such as provided by Sprint Nextel Corporation and identified by the trade names Push-To-Talk (PTT) or Direct Connect. The popularity of dispatch calls is ever expanding and this increase in popularity has created a demand for more features to be associated with these types of calls.

One type of dispatch call is a multi-party communication session. In this type of call, whereas only one person at a time is able to speak, multiple participants can speak at any time during the call. However, there may be times when it is desirable that only specified persons can talk during a portion of the call, i.e., the specified persons have the "floor", and the remainder of the participants are permitted to talk during another portion of the call. This may be particularly useful, for example, when a company is conducting a multi-party dispatch call and a presentation is made by a presenter during a first part of the call and a question and answer session for participation by all participants is conducted after the presentation. In this circumstance, it would be desirable that only the presenter has the floor during the presentation part of the call and all participants could have access to the floor during the question and answer session.

Therefore, it would be desirable to provide an improved multi-party dispatch call capability that includes the floor control functionality discussed above. This improved capability could provide greater functionality for conducting a particular type of multi-party dispatch call.

SUMMARY OF THE INVENTION

In accordance with an embodiment of a method of the present invention, the method includes establishing a dispatch multi-party communication session in a dispatch network, conducting a first portion of the session in a broadcast mode, and conducting a second portion of the session in an open mode.

In accordance with an embodiment of a system of the present invention, the system includes a dispatch network wherein the network establishes the dispatch multi-party communication session and wherein the network conducts the first portion of the session in the broadcast mode and the second portion of the session in the open mode.

DETAILED DESCRIPTION OF THE EXEMPLARY EMBODIMENTS

In this specification, a public chatroom and ad-hoc chatroom of the present invention are first described. Following this description, the broadcast chatroom of the present invention is described. As will be further explained below, regardless of how a particular chatroom is established, e.g., as a public chatroom or an ad-hoc chatroom, and what features are included in the chatroom, the additional functionality of a broadcast chatroom may be included in the dispatch chatroom.

Figure 1:
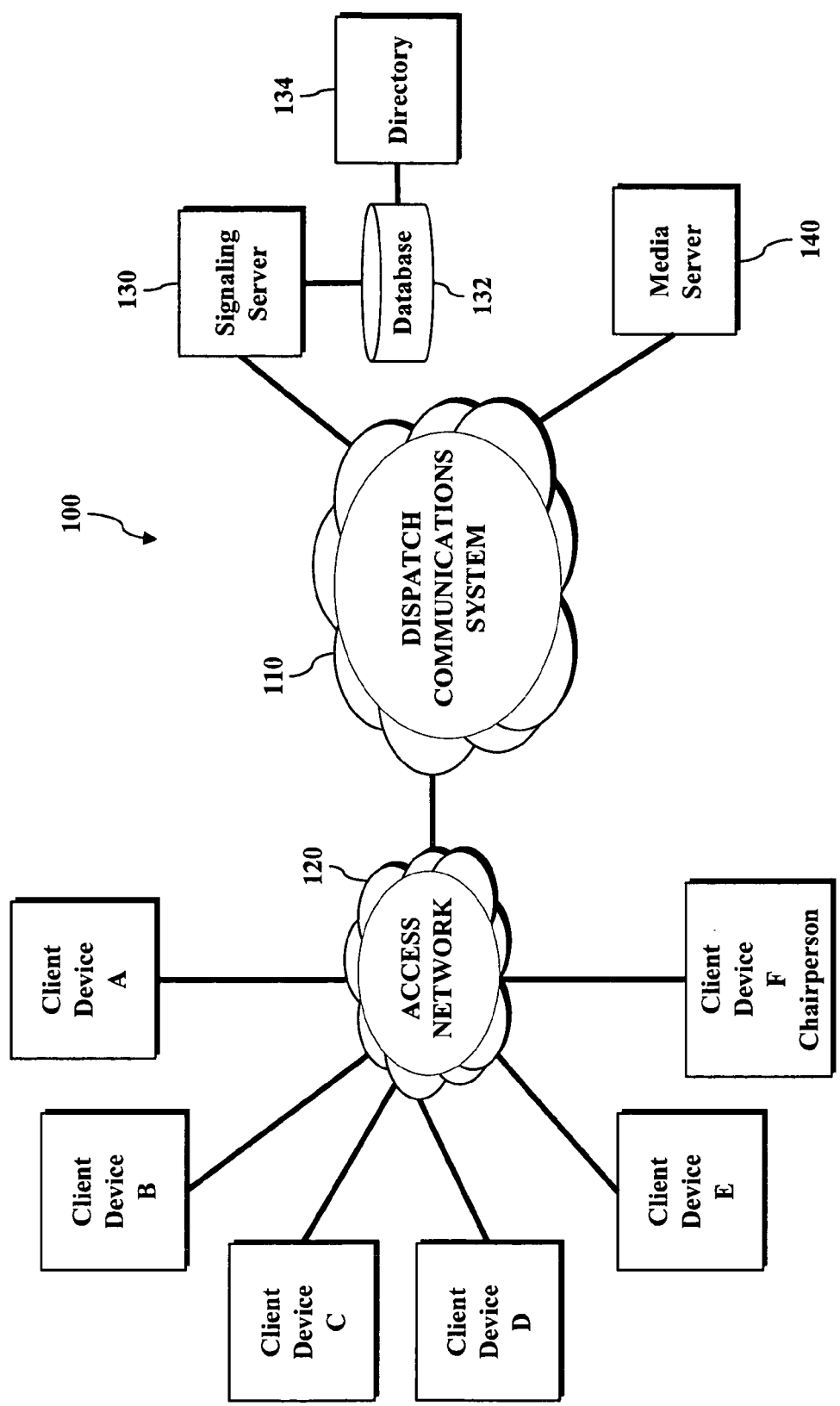
FIG. 1 illustrates an embodiment of a dispatch chatroom in accordance with the principles of the present invention.

FIG. 1 illustrates an exemplary method and system in accordance with an embodiment of the present invention. As described in more detail below, in accordance with the principles of the present invention, a dispatch multi-party communication session may be conducted as a public dispatch chatroom which includes a plurality of client communication devices A-F communicating through the dispatch network. The dispatch network 100 includes a dispatch communication system 110 and an access network 120, which may be either a wire-less or wire-line network. The dispatch network uses the signaling server 130 and media server 140 to support the public dispatch chatroom communications. Signaling server 130, among other functions, performs call set-up, floor control and access, and call termination functions for the dispatch communication session. Signaling server 130 may include, or be coupled to, chatroom definition database 132. As will be explained further later in this specification, database 132 may contain configurable parameters for the public chatrooms and a directory 134 of available public chatrooms. The client devices can be mobile telephones, IP-based telephones, desktop computers, or any other type of device which is capable of dispatch communications. As will be further explained later in this specification, one of the client devices can be associated with a chairperson of the chatroom.

Public chatrooms can be pre-defined in database 132 through a telecommunications service provider network, such as a cellular network operator. They can be defined via a web-based client or handset with a session initiation protocol (SIP) uniform resource locator (URL) and a chairperson SIP address with specific privileges. Any subscriber to network 100 may establish a public chatroom through the network and the participation in the chatroom is open to any subscriber, i.e., the chatroom is public. Thus, a subscriber that desires to participate in a public chatroom does not need to be defined as a member of a group for the dispatch multi-party session, nor does the subscriber need to be invited to join the session.

Further with respect to public dispatch chatroom database 132, the database contains configurable parameters for the particular chatrooms. For example, the database can be configured with information regarding the maximum number of participants, the duration of the chatroom, the person(s) with chairperson privileges, etc. The person responsible for establishing the chatroom, and/or the chairperson, may set the configurable parameters through network 100. Once these parameters are set, the signaling server 130 utilizes this information in supporting the conduct of the public chatroom.

Figure 2:
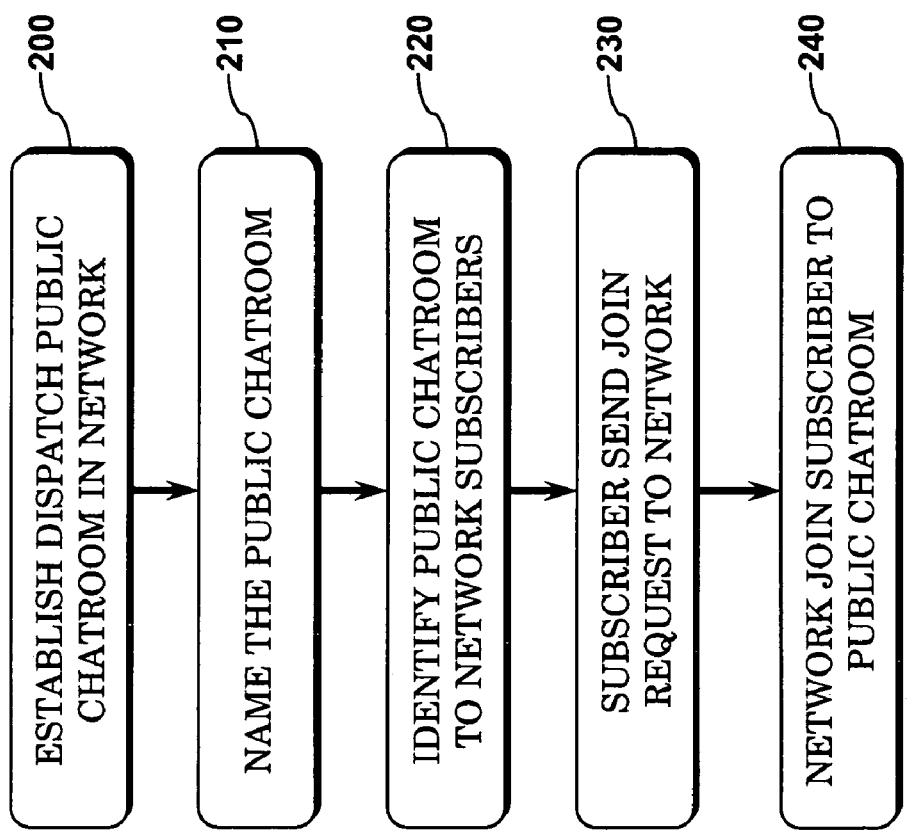
FIG. 2 illustrates an embodiment of a method for conducting a dispatch chatroom in accordance with the principles of the present invention.

In accordance with an embodiment of a method of the present invention, as can be seen in FIG. 2, to conduct a dispatch public chatroom, in step 200 a dispatch multi-party communication session is established in the dispatch network. The session can be established by dedicating the network resources, e.g., the signaling server and media server, to conduct the session and defining the parameters of the chatroom in database 132. In step 210, the public chatroom is given a title to identify the session, e.g., a name that reflects the subject matter of the session or the sponsor of the session. In step 220, the session is identified to subscribers of the network to make them aware of the existence of the chatroom.

The present invention is not limited to any methodology for identifying the public chatroom to the network's subscribers. All that is required is that the subscribers be able to become aware of the public chatroom so that they can participate if they desire. For example, as will be further discussed below, the names and/or addresses of the public chatrooms can be stored in the network for access by the subscribers. Thus, the subscriber could query the directory 134 to obtain a listing of available public chatrooms. Alternatively, the network can provide the available chatrooms to the subscribers. The network can either directly provide the names/addresses to the subscribers, e.g., by sending them to their mobile phone, or can indirectly provide them, e.g., by posting the address on a publicly viewable sign. An example of an indirect posting could be a highway electronic sign that informs network subscribers of a public chatroom that has been recently established to discuss delays occurring on the subject highway.

Continuing in step 230, if a subscriber desires to participate in a public chatroom, the subscriber can send a join request to the dispatch network in response to the identification of the chatroom and, in step 240, the network then joins the subscriber to the public chatroom if it already has other participants. If the chatroom has been established but does not currently have any participants, in response to the join request, the network will start or restart the chatroom. In step 230, all that is required is that the subscriber communicate to the network that the subscriber desires to join a particular public chatroom. The "join request" is not limited to any particular methodology, format, or content, rather, it is merely an indication by the subscriber to the network that the subscriber desires to participate in the public chatroom. It could be as simple as selecting a public chatroom from a listing of public chatrooms on the subscriber's phone by using the telephone's keypad. Similarly, step 240 does not require any particular methodology for joining the subscriber to the public chatroom by the network. All that is required is that the network connect the subscriber to the public chatroom so that the subscriber can participate in the chatroom.

As discussed above, the network will identify public chatrooms to subscribers and users have the ability to browse current chatrooms and select/join as they wish. In accordance with an embodiment, a user accesses the chatroom by scrolling through available chatrooms in the public chatroom directory 134, separated by category, e.g., sports, traffic, personals, etc. The user highlights the chatroom she wishes to join and then presses the join softkey. A user may also enter the full address of the chatroom and select join, highlight the chatroom address from the call history list and select join, or select the address saved to her phonebook and join from there. Thus, dispatch users may join any public chatroom available without having to receive an invitation. Upon "joining" a chatroom, a user is placed directly into the chatroom and may be notified via text and an audible tone that she is active. Once the user is active in the call, the dispatch button becomes enabled to request the floor.

Thus, as discussed above, the potential participants in the public chatroom dispatch call are not required to be included in a defined group; this is in contrast to the method of how certain group calls are currently established by using a defined group. The present invention provides the flexibility of conducting a chatroom based on an individual's own desire and initiative to participate as opposed to requiring a third party's initiative to include the individual in the chatroom, e.g., by including the individual in a defined group or inviting the individual to participate.

However, in accordance with another feature of the present invention, a dispatch user may send an invitation to join any public chatroom to any other dispatch user. Thus, a subscriber may receive an invitation to join a chatroom from the chairperson or other participants in the public chatroom. When an invitation is sent, the inviter is immediately placed into the chatroom. The called party(s) will receive the invitation with the time/date stamp and are given the option to join, decline, or snooze the invitation by pressing the appropriate softkey. The invitation can be sent using a short message service (SMS) message or the like. In an immediate chatroom invite, as soon as the chairperson sends the invitation, he/she is immediately placed into the chatroom and waits for others to join.

Each called party may decide whether to opt-in to the chatroom. That is, the called party is not a participant in the chatroom unless the called party accepts the invitation to join the chatroom. If the called party either declines the invitation or defers acting on the invitation, the called party is not a participant in the chatroom, i.e., does not hear audio communications from, nor provide communications to, other participants in the chatroom.

The present invention is not limited to any particular methodology for sending an invitation to a called party. All that is required is that a participant is able to identify potential participants for the chatroom and identify those participants to the dispatch network. The dispatch network sends an invitation to each potential participant that includes options for participation. The invitation can be in an audio-visual format where the recipient receives both an audible indication at their phone that they have been invited to participate and a visual indication that can be displayed on the phone. As discussed above, the invitation can also be sent as a text message, e.g., a short message service (SMS) message.

In accordance with another feature of the present invention, invitations can be sent for chatrooms scheduled to take place in the future. The chairperson or person sending the invitation sets the time and date of the chatroom in the invitation menu prior to sending the invitation. The invited party(s) receive the invitation and the invitation states the time and date of the scheduled chatroom. Any invitee can accept the invitation by pressing the "accept" soft key and the time/date of the chat will be stored, decline the invitation, or respond tentatively to the invitation. The sender of the invitation has the option to receive audible and UI messages notifying him that one of the invitation recipients has responded to the invite. For those invitees who have accepted or are tentative, at the actual start of the chatroom, they will be prompted to join, decline, or snooze the invitation. The sender of the invitation can check a roll call to see who has accepted/declined/tentatively accepted the invitation and who has not yet responded. Finally, the sender can set up and send an invitation with an automatic reminder so that each invitee is reminded of the call just prior to the chatroom starting.

Figure 3:
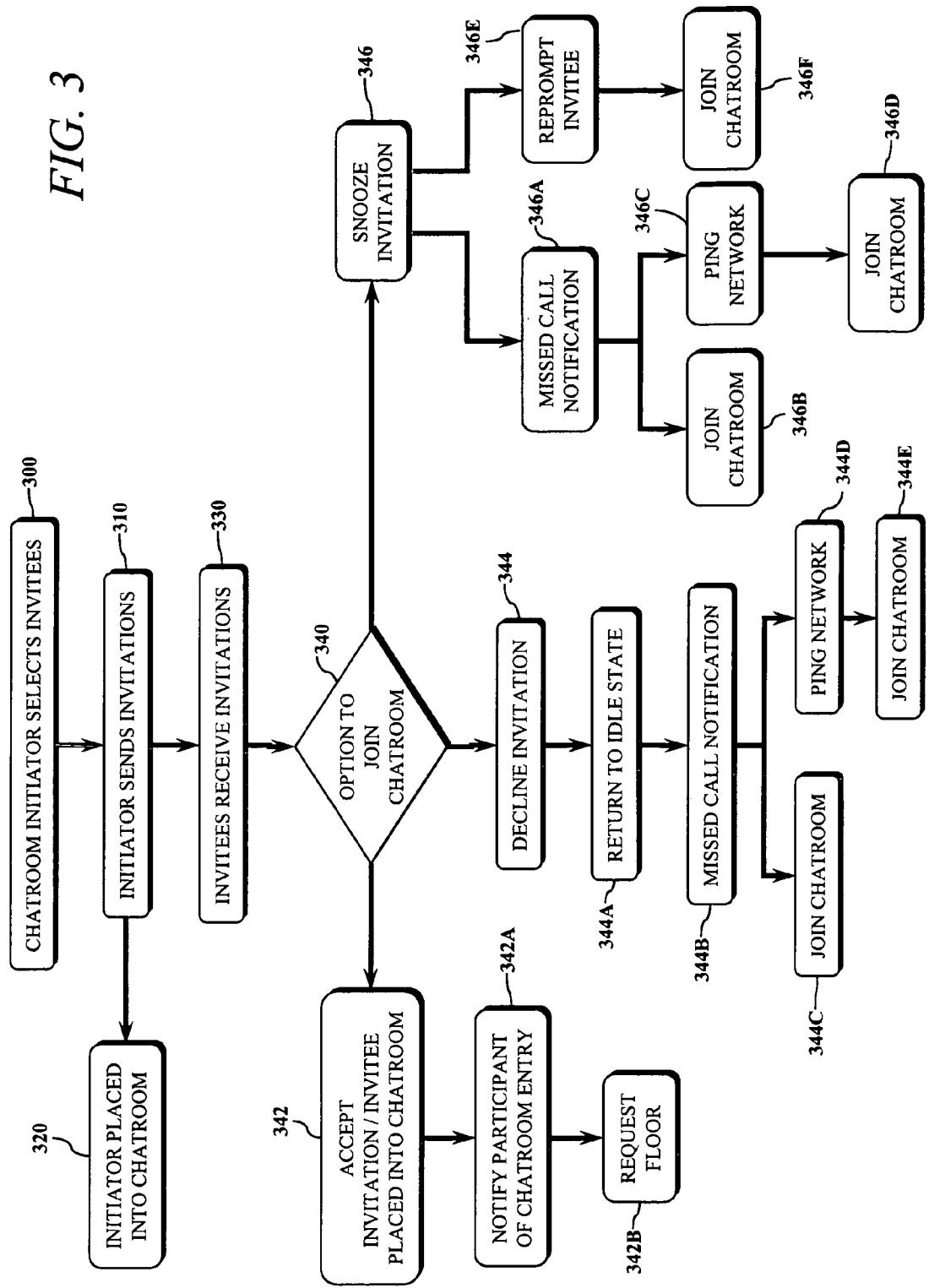
FIG. 3 illustrates an embodiment of a method of inviting a party to participate in a dispatch chatroom in accordance with the principles of the present invention.

As illustrated in FIG. 3 in an embodiment of a method of the present invention, in step 300 the dispatch user is able to select members for participation from his telephone's phonebook or enter new addresses for members not in the phonebook. After selecting the individuals or entering user addresses, in step 310 the inviter can actuate a soft key on the inviter's telephone to send the invitations to the potential participants to join the public chatroom via the network.

After the inviter sends the invitations, he is placed directly into the chatroom if he is not already a participant, as illustrated in step 320. The potential participants will receive the invitation in step 330 with a time/date stamp and, as discussed above, are given the option to join in step 340. In response to the option to join, the invitee may either accept the invitation and join the chatroom in step 342, decline the invitation in step 344, or snooze the invitation in step 346, e.g., defer the invitation, by pressing an appropriate softkey.

The inviter may also send a chatroom invitation while he is active in a current public chatroom. While in the chatroom, the inviter may enter a chatroom menu and select "invite" as he would when setting up a new invitation prior to joining a chatroom. The inviter also has the option to receive/disable audible and user interface (UI) messages notifying him that an invite recipient has joined/declined/snoozed the chatroom invite.

The default text message appearing on the UI of an invitation recipient is "Chat invite received from "username"". An inviter may also configure his own text message to be sent instead of the default message or select from a list of predefined invite messages, such as "urgent", "attendance required", "please join", etc.

As shown in step 342, pressing the "join" softkey places the invitee directly into the chatroom. Acceptance of the invite by the invitee causes the invitee to be joined to the chatroom by the dispatch network. The participant will be notified that he is active in the chatroom in step 342A, for example, via text and/or an audible tone. Once the participant is active in the call, the dispatch button on the telephone handset becomes enabled to request the floor in the dispatch public chatroom as illustrated in step 342B. As is well known, and as discussed previously, dispatch communications are half-duplex communications where only one person at a time is able to speak. When a party has the "floor" they are able to speak during the session.

If the invitee does not respond to the invitation after a specified amount of time, e.g., if the invitee has snoozed the invite, the UI returns to its idle state and a notification is placed in the invitee's telephone "missed call" log with a time/date stamp as illustrated in step 346A. When the user is checking their missed calls, the user is given the option to join the chatroom in step 346B or ping the network in step 346C to determine if the chatroom is still in session. If it is still active, i.e., at least 1 user is in the chatroom, the user is given the option to join the chatroom in step 346D. If there is no one else in the chatroom, the user is notified that there is no one in the chatroom and the user is then prompted to return to the main menu. Alternatively, the chatroom invitation can be cleared from the user's device upon expiration of the chatroom and/or the user can be provided with a recording of the chatroom session. If the missed call is for a future chatroom invitation, the user has the option to accept/decline/tentatively accept the chatroom invitation.

Further regarding the options of snoozing the invitation and declining the invitation, if a user snoozes the invitation, in step 346E the present invention may re-prompt the user to join the chatroom after a period of time. The user may then join the chatroom, as shown in step 346F. If the user declines the invitation, in step 344A the user's handset may be placed back into its idle state. Also, similar to the process described above regarding snoozing the invite, if the user declines the invitation a notification is placed in the invitee's telephone "missed call" log with a time/date stamp as illustrated in step 344B. From the missed call log, the user can join the chatroom in step 344C or ping the network in step 344D to determine if the chatroom is still in session. If it is still active the user is given the option to join the chatroom in step 344E. If there is no one else in the chatroom, the user is notified that there is no one in the chatroom and the user is then prompted to return to the main menu. Alternatively, the chatroom invitation can be cleared from the user's device upon termination of the chatroom and/or the user can be provided with a recording of the chatroom session.

The status of the invitees will be available to the chairperson or the person who sent the invitation. A user can also set up personal reminders for chatrooms so that a notification will be sent to themselves at the time of the chatroom for prompting the user to join the chatroom, decline the chatroom, or snooze the reminder. In the event that a user is out of the network's coverage area or not powered-up when a reminder is scheduled, the user will be reminded of all missed reminders upon power-up or reentering the network's coverage area. Additionally, if invitations were directed to the user during an out-of-coverage or powered-down timeframe, the user will be prompted accordingly to consider the invitations upon power-up/regaining of coverage. The invitations sent during these times will be stored until the user can receive them.

Generally, upon joining a public chatroom, the user may converse with anyone else (unless privileges are denied by the chairperson) in the room and all participants who have joined the chatroom will be able to hear all conversation. When the floor is open, the user interface (UI) and an audible tone alerts the participants as such. When the participant tries to take the floor and is unsuccessful, there will be a distinct audible tone heard by that participant only, as well as when the participant is successful in taking the floor. The name or alias name of the user who owns the floor is to be displayed on all users' UIs.

Participation in the public chatroom is scalable. For example, one chatroom may be limited to 100 members on a regular basis, however, at some point needs to be changed to handle 500 members. Another chatroom may be limited to 300 members and another at 700 members. As will be discussed further below, the chairperson has the capability to scale the size of the chatroom while the chatroom is idle, i.e., no participants. As discussed previously, the size of the chatroom, along with other chatroom parameters, are configurable parameters that may be set and stored in database 132.

At any time during the public chatroom the chairperson may view a list of all participants currently on the call, all who were previously on the call and dropped off, and all who are on the call but have the session on hold, e.g., for the purpose of being on another call. Also, the chairperson may view the status of all invitees to the chatroom, e.g., declined, snoozed, currently on call, on hold, previously on call and dropped off, etc. If the chairperson switches to another call and places the public chatroom on hold, he will not receive audible tones and text informing him of who is joining the call, in the event he requested this capability from the network when sending invitations. However, the chairperson may view the public chatroom role call to see who is on the call through chatroom monitoring.

Chatroom participants have the ability to maintain anonymity by creating an alias address. When a user sends an invitation or receives one, he has the option to join the chatroom under an alias name. Using an alias name will provide the user with privacy/anonymity, if desired. When sending an invite, the user may either select from a list of names he has set up in his personal options or can enter a new alias name under which he wants to send an invitation. When accepting an invite, the user can be prompted for an alias name under which he would like to join the chatroom. The user could then select from the list of names he has set up in his personal options or can enter a new alias name. If the user enters the chatroom with a duplicate alias name, i.e., one that is already in use by another chatroom participant, he can enter the chatroom with the selected alias but with a number provided after the alias name to distinguish him from the other participant, e.g., John(1).

Each participant in a chatroom will only be able to see the alias address, and not the primary address, of other participants. Therefore, as discussed above, a participant can maintain anonymity and protect the privacy of his personal address with respect to other participants. However, when an invitee accepts an invitation and uses an alias address, in an embodiment, the public chatroom chairperson receives a notification that "JaneDoe@sprint.com" has accepted the invitation and has entered the chatroom as "Janie".

Because there may be a possibility that an invitee may attempt to utilize an alias that may be inappropriate and/or offensive to certain other participants, the dispatch network may filter the alias selected for use by a participant prior to its use for a determination as to its acceptability. A user who attempts to use an inappropriate alias address, as determined by reference to a database of restricted words, will be re-prompted to either select a different alias address, enter the chatroom by using his primary ID, or not enter the chatroom. The chairperson is also able to restrict an invitee from joining the chatroom under an alias that is not acceptable as determined by the chairperson.

In order to accurately monitor and control the chatroom, the chairperson is able to see the primary account address of a user regardless of what alias the user may be using. For example, if an individual has been banned from a chatroom, he will not be able to re-enter merely by changing his alias name.

If a participant is acting inappropriately in the chatroom, the chairperson can view the user's primary ID and temporarily block him from the chatroom, making him unable to continue conversation in the chatroom since he would be dropped from the call. A UI message is sent to the user notifying him that he has been blocked. The chairperson can also permanently block him from returning to the chatroom indefinitely by blocking his primary user ID. The user will not be able to re-enter merely by changing his alias address. The chairperson of the public chatroom, and anyone else the chairperson enables with chairperson privileges for a specific chatroom, are the only individuals that may view primary user IDs and block users.

In the present invention, the blocking options include:
temporarily blocking a user for a configurable duration, e.g., 24 hours, with a warning being sent to the user;
permanently blocking the user from the chatroom after a specified number of blocks, with notification being sent to the user; and
entering narrative text in a text box by the chairperson describing the reason for the block and/or any other pertinent information regarding the block.

As with the other configurable parameters for the public chatroom, the blocking options may be set in database 132. Signaling server 130 implements the set blocking parameter in conducting the public chatroom session.

A system configurable chatroom timer provides the public chatroom with a hang time feature. Therefore, if all participants exit a public chatroom, the chatroom will remain "active" for a specified period of time, i.e., the hang time, and will not automatically time-out. After the hang time expires, the public chatroom will restart if still authorized and if someone enters the chatroom. Additionally, a participant may re-enter the chatroom after exiting it. The participant may re-enter prior to the expiration of the hang time or, as discussed above, after the hang time expires if still authorized.

The user has three options for saving the chatroom address to his phonebook. After participating in the chatroom, the address of the chatroom can be stored in the user's "Call History" list and the user may save the address to his local phonebook eliminating the need to locate this chatroom again through the chatroom directory. A second option is for a user to identify a chatroom from the public chatroom directory and save the address to his phonebook without joining the chatroom. The third option is for a dispatch user to directly enter and save the address to his phonebook.

The public chatroom may be sponsored by a company, individual, or any other entity. The sponsor is the entity that is responsible for establishing the existence of the chatroom. The sponsor may also manage the parameters of the chatroom. For example, the sponsor could determine whether the public chatroom would always be in session or only be in session for scheduled times and topics, be conducted for either a specified discussion topic or to provide an open forum for discussion, and determine how the chatroom would be identified to the subscribers. The sponsor could also be the chairperson of the chatroom or could designate a person to be the chairperson, if the chairperson functionality is implemented. It is not required that the sponsor be a participant in the chatroom.

Further to the above, the public chatroom can be sponsored by the telecommunications service provider, e.g., the dispatch carrier. In this case, the dispatch carrier owns its own chatroom SIP addresses, e.g., chatroom addresses for public chatrooms related to the topics of Route 66, beach traffic, etc., and would also manage the number of participants permitted in the chatroom and the administration of the chatrooms, e.g., by a carrier chairperson.

The following are exemplary use cases for a public chatroom in accordance with the principles of the present invention.

Martha wishes to join a chatroom. Martha browses the chatrooms that are available through the chatroom directory, highlights the chatroom of interest, and joins by selecting the join softkey. Martha is immediately placed into the chatroom and may begin conversing with others using the dispatch button to take the floor. After Martha ends her participation by hitting the end key, she goes to her call history list and saves the chatroom address to her phonebook for future use.

John joins public chatroom ABC and wishes to invite Carol, Greg and Cindy to the chatroom. John selects the option "invite others" from the menu, goes to his address book and selects the individuals he'd like to invite, and sends invitations for them to join the chatroom. Upon the invitees joining the chatroom, John receives an audio signal and text notifying him who from his invite list has joined the chat.

The Company XYZ public "Recall" chatroom is limited to 100 members. However, due to a recent new announcement on a major recall, the chatroom is temporarily changed to accommodate 500 members by the chairperson. After the effect of the recall announcement settles down, the chatroom chairperson then scales back the chatroom down to its original 100-member limit.

Another example of a public chatroom, as mentioned briefly above, can be a traffic information chatroom. For example, a public dispatch chatroom can be dedicated to a particular highway, such as Route 66 mentioned above. Accordingly, users can join the chatroom to monitor others' communications. These communications can identify accidents and/or congestion. As discussed previously, the users can be informed of the existence of the public chatroom by an electronic sign that is located, for example, on, or in proximity to, the highway. Yet another type of chatroom can be a sports-themed chatroom. For example, a chatroom can be established for a particular sport or a particular sports team.

As discussed above, in an embodiment, the public chatroom has a chairperson. While it is not required that the chatroom have a chairperson, it may be desirable for management of the chatroom since the participants in the chatroom may not be familiar to the sponsor, for example. This is in contrast to known methods for establishing dispatch group calls where the group members are defined and presumably known by the call participants. The chairperson may be the party who set up the chatroom or who is designated through the set up process or may be another participant in the chatroom as designated by the sponsor. The chairperson may be a wireless network operator's employee, where a wireless network operator sponsors its own chatrooms or the chairperson may be someone designated from a company-sponsored public chatroom. The chairperson may have the following privileges, which are not intended to be all inclusive, but rather, are to be understood in conjunction with the entirety of this specification:

| Chairperson Privileges |
| --- |
| View logistics of the chatroom (e.g., member list, priority levels) |
| View the users' primary IDs to properly manage the chatroom |
| Merge two chatrooms together (by a chairperson who is the chairperson for both chatrooms) and view the details of both chatrooms together |
| View roll call to see who is on the call at any given period of time, who was on the call but now has dropped off the call, and who has put the call on hold |
| Monitor the chatroom while actively participating. Monitoring a chatroom may consist of viewing active participants, participants who are "active" but in another session, participants who were active but have exited, listening to chatroom conversations, and viewing chatroom conversations via text from the desktop |
| Monitor the chatroom while not participating - (Voice to text capabilities support multiple window viewing of chatrooms on the desktop) |
| Scale the size, i.e., the number of possible participants, of the chatroom while the chatroom is idle |
| Tear down a chatroom |
| Take the floor at any time |
| Send text messages to a participant |
| Break into a session, i.e., enter or become active in a chatroom that is being passively monitored |
| Manage audio and text signals, e.g., to all in the chatroom when someone has entered or exited |

| -continued |
| --- |
| Chairperson Privileges |
| Ability to turn on/off audible tones/messages/UI receipts/notifications of people joining/exiting a chat |
| Manage a question/answer session |
| Actively participate in the chatroom |
| Send invites to users for the respective chatroom |
| Manage the privileges and/or memberships of users, including: |
| Enable or disable select participants from taking the floor during the chatroom, e.g., in a broadcast type of chatroom |
| Disconnect one or many participants without interrupting the chatroom |
| Disable one or many participants from rejoining the chatroom (temporarily or permanently) |
| Block users from entering a chatroom |
| Assign priority levels to members to enable greater floor control |
| Delegate a subset of, or all, chairperson privileges to another chatroom member |
| Enable/disable ability of users to send invitations |

As discussed above, the chairperson may delegate all or a subset of the chairperson's privileges to one or more chatroom participants. In this circumstance, there may be a number of chairpersons, however, the original chairperson may still maintain absolute control over the chatroom, i.e., they can overrule decisions made by the other delegated chairpersons. The chairperson may assign his privileges to another individual while maintaining his own rights as chairperson.

The below are exemplary use cases for several of the privileges discussed above for the functionality of the public chatroom chairperson.

Rita is the chairperson of a public chatroom. Rita is monitoring the chatroom and notices that a particular participant is acting inappropriately. Rita goes into the chatroom set up on her desktop, identifies the user, and terminates him from the chatroom. The termination is tagged to the primary user name, regardless of whether or not the user is using an alias name in the chatroom, so that further entry into the chatroom is prohibited regardless of the alias name used, if any.

Bill is the chairperson for the ABC company public chatroom which is sponsored by the ABC company. During the chatroom, a presentation will be made and, because this is a company sponsored chatroom, the company wants to prevent interruptions during the presentation. Therefore, Bill, through his chatroom menu options blocks all participants other than the presenter(s) from taking the floor during the presentation. When the presentation is over, Bill is able to unblock the other participants so that questions can be asked.

An additional functionality the chairperson has in the present invention is the ability to monitor and manage the chatroom remotely, e.g., from an internet web client device. Thus, the chairperson is able to exercise all of his privileges as discussed above remotely. For example, the chairperson is able to view participants, block participants, shut down the chatroom, start the chatroom, restrict membership (e.g., one user, a group of users via a domain, or by allowing a specific domain), disconnect participants, etc., from any remote device, e.g., a desktop computer, laptop, PDA, handset, etc. In an embodiment, as shown in FIG. 1, client device F of the chairperson would be a desktop computer with an interface to the chatroom. The chairperson would be able to hear the audio from the chatroom on the desktop as well as control the chatroom from it, as discussed above.

The below are exemplary use cases for the use of a remote device by the public chatroom chairperson.

Tom begins a chatroom by launching the chatroom from his desktop web client. From his web interface, Tom is able to see who is on the call and can provide the sponsoring company with a list of participants.

Sharon is monitoring a chatroom from her web interface. From the web she is able to disconnect one of the members who is acting inappropriately and block him from returning to the chatroom.

In accordance with another aspect of the present invention, any chatroom participant can send a text message sidebar communication to any other chatroom participant. The sidebar communication is only communicated to the sidebar participants and is not communicated to any other participant in the public chatroom.

The following table summarizes the features and functionalities of a public chatroom in accordance with the principles of the present invention and exemplary embodiments thereof. This table is not intended to be all inclusive, but rather, is to be understood in conjunction with the entirety of this specification:

| |
|---|
| Any user can join the chatroom |
| Any user can start the chatroom |
| Companies can manage own chatroom |
| Address predefined through service provider (e.g., Sprint Nextel) |
| Open participation (any user can join) |
| Any participant can send invites to other users |
| Directory of available chatrooms |
| Scalable participation size (in increments of 10) |
| Alias addresses enabled |
| Join a call using a "join" softkey |
| Join a chatroom without receiving an invitation |
| Initiate a chatroom (chatroom pre-exists so would not be initiated but anyone could join) |
| Save chatroom address to phonebook |
| Reinitiate a chatroom (pre-exists so would not be initiated but anyone could join) |
| Users may opt-in to a chatroom when receiving an invitation |
| User may join a chatroom without receiving an invitation |
| The chairperson is preauthorized with certain privileges |
| Any user can send an invitation |
| Any user can invite a participant to a chatroom after the chatroom is in session |
| Participant receives notification that he is active in the call via audible tone and text message |
| Invitations can be sent using a default or user configurable text message to appear on invitee's UI |
| Target who missed an invitation can ping network to see if chatroom still in session and join |
| Decline a chatroom invitation |
| Snooze a chatroom invitation |
| Any user can send a text message sidebar to another chatroom participant |
| Any user can view list of chatroom participants (alias address is what is provided) |

Subscribers to network 100 may also establish an ad-hoc chatroom through the network. In establishing an ad-hoc chatroom, invitations are sent to a group of called parties, as selected by the initiator of the chatroom, for participation in the chatroom. Each called party may decide whether to opt-in to the chatroom. That is, the called party is not a participant in the chatroom unless the called party accepts the invitation to join the chatroom. If the called party either declines the invitation or defers acting on the invitation, the called party is not a participant in the chatroom, i.e., does not hear audio communications from, nor provide communications to, other participants in the chatroom. Therefore, in accordance with the principles of the present invention, a called party is a participant in a multi-party dispatch communication only if the called party decides to accept an invitation to join the call. This is in contrast to current methods for establishing dispatch group calls where if a group member is available, e.g., their phone is turned on and they are not involved in another call, the group member is automatically a participant in the group call, i.e., can hear and provide audio in the call, and must opt-out of the call after being a participant in the call. Thus, in the ad-hoc chatroom of the present invention, invitations are sent to called parties to participate in a multi-party call and the called party is a participant in the call only if the called party accepts the invitation.

Additionally with respect to an invitee joining the chatroom, in accordance with the principles of the present invention, the joining of one invitee to the chatroom has no effect on the other invitees to the chatroom. Thus, each invitee is able to independently decide whether to join the chatroom or not, regardless of the decision of another invitee. This is in contrast to a currently known method of establishing a dispatch group call where if at least one member of the pre-defined group is available for the group call, that member is automatically joined to the call and all other available group members are automatically joined to the call. Thus, in this known method, the group members cannot individually decide to opt-in to the group call. They are automatically opted-in to the call if they are available and must then opt-out of the call if they no longer desire to participate. In the ad-hoc chatroom of the present invention, the invitee to the chatroom must opt-in to the call in order to participate.

As discussed previously in the context of the public chatroom of the present invention, an ad-hoc chatroom is not limited to any particular method for sending an invitation to a called party. All that is required is that an initiator of the ad-hoc dispatch chatroom is able to identify potential participants for the chatroom and identify those participants to the dispatch network. The group of called parties is defined by the initiator of the ad-hoc chatroom contemporaneous in time with transmitting invitations to the called parties. Similar to an invitation sent in the public chatroom, the dispatch network sends an invitation to each potential participant that includes options for participation. Also similarly, the invitation can be in an audio-visual format where the recipient receives both an audible indication at their phone that they have been invited to participate and a visual indication that can be displayed on the phone; the invitation can be sent as a text message, e.g., a short message service (SMS) message; and invitations can be sent for chatrooms scheduled to take place in the future.

As discussed above, the potential participants in the ad-hoc chatroom dispatch call are not included in a pre-defined group. The chatroom initiator has the flexibility to identify and invite potential participants contemporaneously with the requirement for establishing the chatroom. Thus, in contrast to the method of how certain group calls are currently established by using a pre-defined group, the present invention includes the flexibility of forming a chatroom on an ad-hoc basis. The invitation process for the ad-hoc chatroom may include the steps of FIG. 3 as discussed previously in the context of the public chatroom.

The initiator of the ad-hoc chatroom may be designated as the chatroom chairperson. As discussed previously, the chairperson has general administrative authority for conducting the chatroom. While it is not required that the chatroom have a chairperson, it may be desirable for management of the chatroom. The chairperson may be the party who set up the chatroom or may be another participant in the chatroom as designated by the initiator. The chairperson may have the privileges discussed in the context of the public chatroom, which are not intended to be all inclusive, but rather, are to be understood in conjunction with the entirety of this specification.

Though the chairperson is placed directly into the chatroom while waiting for others to join, if the chairperson exits the chatroom prior to anyone else joining, the chatroom will stay active for a specified period of time. The chairperson will be able to re-enter the chatroom through the recent calls list on his telephone.

Any dispatch user subscribing to the ad-hoc service provided by the dispatch network may send initial invitations to any other dispatch user. In an embodiment, the chairperson, who may be the originator of the ad-hoc chatroom, is the only person that can send an invite after the initial invitations have been sent and the chatroom is in session.

If the chatroom is terminated or times-out, no participants other than the originator may restart or re-invite members to the ad-hoc chatroom. Any previous participant in the chatroom who was not the chairperson/originator and who desires to reinitiate the chatroom must establish a new ad-hoc chatroom in order to do so.

Similar to the public chatroom, a system configurable chatroom timer provides the ad-hoc chatroom with a hang time feature. The ad-hoc chatroom participants can reenter the chatroom from their call history list during the hang time. After expiration of the hang time, the group of participants in the ad-hoc chatroom is disestablished. Additionally, in an embodiment, when the initiator of the chatroom exits the chatroom the chatroom terminates. However, alternatively, an option can be provided to leave the chatroom active for the other participants when the initiator exits.

An ad-hoc chatroom may also include other features described in this specification in the context of the public chatroom, e.g., use of alias names, blocking a user from the chatroom, remote functionality, sidebar communications, etc., and the ad-hoc chatroom of the present invention is not limited to only the features described in the context of the ad-hoc chatroom.

The following are exemplary use cases for an ad-hoc chatroom in accordance with the principles of the present invention. Ed needs to meet with his on-call team, sets up an ad-hoc chatroom consisting of all team members and sends an invitation to each. Due to the last minute nature of the call, not all members can participate in the chatroom call. Half of the team determines they cannot participate in the call and opt to decline the invitation. The other half accepts the invitation, are immediately placed into the chatroom and may begin conversing. Ed receives text messages of who has opted-in and who has opted-out. For those who have opted-in, Ed also receives an audible tone notifying him of a participant entering the chatroom.

Sarah was in a meeting and forgot her phone. When she returns to her desk she sees that she missed an ad-hoc chatroom invitation from her boss. Sarah is given the option to opt-in to the call or to ping the network to see if the call is still in session. Sarah decides to ping the network by pressing the appropriate softkey. She receives a UI message that the ad-hoc chatroom is still in session and is asked if she would like to join. Sarah opts-in by pressing the join softkey and is immediately placed into the call. The chairperson of the ad-hoc chatroom receives a text message and an audible tone that Sarah has joined the chatroom.

Elizabeth needs to meet immediately with her department members who are volunteering to work the tradeshow floor. Elizabeth sets up a chatroom call to her department and from the menu window of her phone selects to send the invitations with a personal text message. Elizabeth enters the text message or selects from a list of available options, e.g., "meet me for lunch", "urgent", "meeting delayed", then sends the text messages to the chatroom invitees. The personal message appears on the invitees' UI and the invitee is given the option to join the ad-hoc chatroom.

The below are exemplary use cases for several of the privileges discussed previously for the functionality of the ad-hoc chatroom chairperson.

John set up a chatroom but is called away on an emergency. As chairperson, John sets up Amy as the chatroom chairperson so that Amy can monitor the chatroom in his absence. In the meantime, it becomes clear that additional individuals need to participate in the chatroom. Therefore, Amy is able to send invitations to those additional individuals. Amy also receives notification if they join the chatroom and is able to monitor the participation of all participants.

Tom is in an ad-hoc chatroom and is the acting chairperson with the legal department. Paul is participating in the legal chatroom and is also scheduled to launch an ad-hoc chatroom with the marketing department. He puts the legal department chat on hold to start the marketing chatroom and quickly learns that the marketing department and the legal department need to converse to resolve some outstanding issues. Because Paul is not the chairperson of the legal chatroom he is not able to merge the calls together. However, Tom, being the legal chatroom chairperson, quickly assigns Paul the ability to act as chairperson of the legal chatroom by assigning him through his chatroom menu options. Paul then merges the two chatrooms together so that marketing and legal can converse in the same chatroom.

Figure 4:
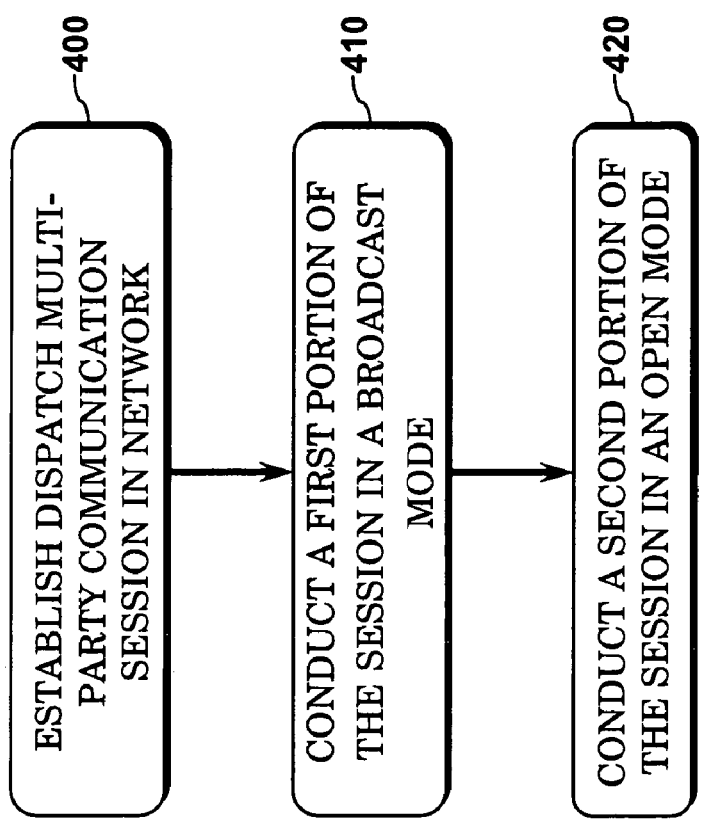
FIG. 4 illustrates an embodiment of a method for conducting a broadcast chatroom in accordance with the principles of the present invention.

Regardless of how a particular chatroom is established, e.g., a public chatroom or an ad-hoc chatroom, and what features are included in the chatroom, as discussed previously, the additional functionality of a broadcast chatroom may be included in a chatroom of the present invention. In conducting a broadcast chatroom in accordance with the principles of the present invention, in an embodiment as illustrated in FIG. 4, a dispatch multi-party communication session, e.g., a chatroom, is established in a dispatch network in step 400. In step 410, a first portion of the session is conducted in a broadcast mode. In an embodiment of the broadcast mode, a chairperson of the chatroom can control the floor of the chatroom such that only persons designated by the chairperson can have the floor during a time period. In step 420, following the broadcast mode portion, a second portion of the session is conducted in an open mode. In an embodiment of the open mode, the floor is opened for participation by all participants in the broadcast chatroom, for example, for a question and answer session.

Thus, the broadcast chatroom includes two modes: 1) a broadcast mode where only a designated person(s) are able to speak, i.e., take the floor; and 2) an open discussion mode where other participants may speak. In the present invention, the chairperson can control the floor of the broadcast chatroom by assigning pre-selected participants to take the floor during the broadcast mode and then allow for all participants to take the floor during the open discussion mode. This may have particular utility for a chatroom to be conducted where a presentation is made by selected participants, i.e., in the broadcast mode, and then questions/answers and discussion is conducted by all participants in the open discussion mode. For example, a company sponsored broadcast chatroom may be used by the company to present a topic where it would like passive listeners only during the presentation. The presentation can either be someone speaking or a recording of some type that would relay a specific type of information to the other participants. The broadcast chatroom chairperson can then have the floor opened for discussion or a question and answer session.

In the broadcast mode, the chairperson can specify who can take the floor and who else may take the floor or present, for instance, in the event there are two people at different locations involved in the presentation. In the broadcast mode, the floor may be held for a configurable period of time. For example, the floor may be held via a toggle "floor hold" soft key available only to the chairperson and/or those with presenter privileges. Presenter privileges may include higher priority levels for taking the floor, for instance, in a Q & A session, or in the open mode, after the presentation, and holding the floor with the soft key, for instance, in a follow-up presentation occurring, for example, after a break. After pressing the floor hold soft key, the floor is held for the configurable duration while the presenter is speaking or a recording is playing, without the need to physically hold down the PTT button. The presenter may press the floor hold soft key again to release the floor and revert back to using the PTT button to take the floor. When the floor hold soft key is pressed to hold the floor, the PTT button is disabled.

In switching from broadcast mode to open mode, the presenter may request that the chairperson open the floor for any participant to take the floor for open discussion, or the presenter may plan in advance when the chairperson may open the floor for discussion. As mentioned above, the presenters are able to maintain priority so that they can take the floor before someone else or take the floor away from someone else. The chairperson may take control of the floor at anytime or block participants from speaking.

The chairperson may switch from broadcast mode to open mode by operating a soft key. Alternatively, the broadcast mode can be defined to last for a specific period of time by using a system timer. Thus, the broadcast mode can be defined to last for a designated time, e.g., for one hour, and then automatically switch to the open mode after expiration of that time. The chairperson could also manually override the timer, if required, by operating the soft key to either extend or reduce the defined period of time for the broadcast mode.

Again, when in the open mode, all participants may take the floor. The chairperson may assign priority for taking the floor to the participants so that he/she can control the precedence of floor requests. The chairperson may utilize the server(s) that support the chatroom session to assist in floor priority arbitration. For example, he/she can directly control the granting of the floor to the participants. In this direct control mode, a talker's place in the priority queue is maintained by the server and the server will keep track of the floor requests for the chairperson, but the chairperson grants the floor. Alternatively, the chairperson can delegate the entire floor arbitration process to the server, e.g., in an automatic mode where the server maintains the priority list and grants the floor to the participants in accordance with the priority list.

Broadcast chatrooms can be operated such that organized question and answer sessions may be conducted with the participants where their respective priority for taking the floor is determined in an orderly manner. In the open mode, participants can request the floor in at least two ways, each of which is discussed below.

First, the chairperson has the option to manually control the open mode. A participant presses a soft key to notify the chairperson that they have a question, for example. As the floor requests come in from the different participants, the chairperson can see the order in which they were received and mediate who may take the floor at specific times to ask their questions. For instance, if there are five floor requests, the chairperson would enable participant "John" to take the floor, while all other participants are in a listen mode only, with the exception of the presenters or those who are to answer the questions. The chairperson would select the user in the queue and the server would send an audible indication that the floor may be taken by the participant. If the participant does not respond, the chairperson is responsible for moving on to the next person in the queue. After the presenter completes an answer to the question, if there are no further questions, the presenter may press a soft key signaling the completion to the chairperson and request to move to the next question, or the chairperson may control how the move is done to the next question.

Second, a participant can press a soft key to request the floor for a question. The server sets the incoming floor requests in a queue and grants the floor in turn. As the talker asks a question and hears the answer, the server automatically moves to the next floor request in the queue. In turn, each participant is individually notified with an audible notification that he/she may take the floor to ask his/her question. If the participant does not ask the question or complete the question within a configurable period of time, the server automatically moves on to the next participant in the queue.

The participants in the queue can see where they are in the queue, e.g., #5 of 20 queued floor requests, and all participants can visually identify the talker and the other participants in the queue, as well as their position in the queue, so the participants can anticipate their turn. An individual, while in the queue, is able to cancel their floor request by pressing the soft key again. As each participant is queued or as each participant cancels his/her request, the floor requests in queue, the current talker and the participant's placement in the queue are updated and displayed accordingly on the UI where applicable.

Other participants may join the chatroom in a listen only mode, until the presenter or the chairperson opens up the floor for the open mode. Upon joining the chatroom, and at anytime during the chatroom if the call toggles from open mode to broadcast mode, the participants are notified with a UI message that they are unable to take the floor.

As discussed above, the broadcast chatroom can be established as a public chatroom or an ad-hoc chatroom and the present invention is not limited to how the participants are included in the chatroom. Whereas the invention, in practice, may be more likely to be utilized in a public chatroom, the invention, as discussed previously, may also be used in an ad-hoc chatroom. The invention can also be used in a closed chatroom, which has a predefined member list and is associated with a chatroom address.

The disclosed embodiments are illustrative of the various ways in which the present invention may be practiced. Other embodiments can be implemented by those skilled in the art without departing from the spirit and scope of the present invention.

What is claimed is:

1. A method for conducting a dispatch multi-party communication session between multiple participants, comprising the acts of:
- establishing a dispatch multi-party communication session in a dispatch network;
- conducting a first portion of the session for a first time period in a broadcast mode, wherein in the broadcast mode a chairperson controls a floor of the dispatch multi-party communication session such that only participants designated by the chairperson, of the multiple participants in the dispatch multi-party communication session, may request to speak during the broadcast mode and wherein all of the participants designated by the chairperson are able to speak during the broadcast mode; and
- conducting a second portion of the session for a second time period in an open mode, wherein in the open mode the chairperson controls the floor of the dispatch multi-party communication session such that all of the multiple participants in the dispatch multi-party communication session may request to speak during the open mode and wherein all of the multiple participants in the dispatch multi-party communication session are able to speak during the open mode;
- wherein the second time period follows the first time period and wherein during the first time period the session is only conducted in the broadcast mode and wherein during the second time period the session is only conducted in the open mode.

2. The method of claim 1 wherein the dispatch multi-party communication session is a public chatroom.

3. The method of claim 1 wherein the dispatch multi-party communication session is an ad-hoc chatroom.

4. The method of claim 1 further comprising the acts of:
- identifying the dispatch multi-party communication session to a subscriber of the dispatch network;
- receiving a join request at the dispatch network from the subscriber in response to the act of identifying the dispatch multi-party communication session to the subscriber; and
- joining the subscriber to the dispatch multi-party communication session in response to the received join request.

5. The method of claim 1 further comprising the acts of:
- receiving an invitation to join the dispatch multi-party communication session directed to a called party at the dispatch network;
- transmitting the invitation to the called party by the dispatch network;
- receiving an acceptance to join the dispatch multi-party communication session from the called party at the dispatch network in response to the invitation; and
- joining the called party to the dispatch multi-party communication session by the dispatch network.

6. The method of claim 1 further comprising the act of conducting a question and answer session in the open mode.

7. The method of claim 1 further comprising the act of presenting a presentation in the broadcast mode.

8. The method of claim 1 further comprising the act of switching from the broadcast mode to the open mode by the chairperson.

9. The method of claim 8 wherein the act of switching from the broadcast mode to the open mode includes the act of operating a soft key.

10. The method of claim 1 wherein the chairperson may speak in the session during both the broadcast mode and the open mode.

11. The method of claim 1 further comprising the act of assigning a priority to each of a plurality of participants that request to speak during the open mode.

12. The method of claim 11 wherein the act of assigning the priority is performed by the chairperson of the dispatch multi-party communication session.

13. The method of claim 11 wherein the act of assigning the priority is performed by a server that supports the session.

14. The method of claim 11 further comprising the act of displaying the priority to each of the plurality of participants that request to speak during the open mode.

15. The method of claim 1 further comprising the act of switching from the broadcast mode to the open mode after expiration of a defined time limit for the broadcast mode.

16. The method of claim 1 wherein the dispatch multi-party communication session is a closed chatroom.

17. A system for conducting a dispatch multi-party communication session between multiple participants, comprising:
- a dispatch network, wherein the dispatch network establishes a dispatch multi-party communication session and wherein the network conducts a first portion of the session for a first time period in a broadcast mode and a second portion of the session for a second time period in an open mode;
- wherein in the broadcast mode a chairperson controls a floor of the dispatch multi-party communication session such that only participants designated by the chairperson, of the multiple participants in the dispatch multi-party communication session, may request to speak during the broadcast mode and wherein all of the participants designated by the chairperson are able to speak during the broadcast mode;
- wherein in the open mode the chairperson controls the floor of the dispatch multi-party communication session such that all of the multiple participants in the dispatch multi-party communication session may request to speak during the open mode and wherein all of the multiple participants in the dispatch multi-party communication session are able to speak during the open mode;
- and wherein the second time period follows the first time period and wherein during the first time period the session is only conducted in the broadcast mode and wherein during the second time period the session is only conducted in the open mode.

18. The system of claim 17 wherein the network assigns a priority to each of a plurality of participants that request to speak during the open mode.

19. The system of claim 18 wherein the network provides the priority to each of the plurality of participants that request to speak during the open mode.

20. The system of claim 17 wherein the network establishes the dispatch multi-party communication session as a public chatroom.

21. The system of claim 17 wherein the network establishes the dispatch multi-party communication session as an ad-hoc chatroom.

22. The system of claim 17 wherein the network establishes the dispatch multi-party communication session as a closed chatroom.

23. The system of claim 17 wherein the dispatch network includes a timer and wherein the network switches from the broadcast mode to the open mode after a defined time limit expires in the timer.

* * * * *